(12) United States Patent
Hediger

(10) Patent No.: US 9,738,048 B2
(45) Date of Patent: Aug. 22, 2017

(54) POWDER PRESS ASSEMBLY

(71) Applicant: Erowa AG, Reinach (CH)

(72) Inventor: Hans Hediger, Reinach (CH)

(73) Assignee: EROWA AG, Reinach (CH)

( * ) Notice: Subject to any disclaimer, the term of this patent is extended or adjusted under 35 U.S.C. 154(b) by 14 days.

(21) Appl. No.: 15/098,460

(22) Filed: Apr. 14, 2016

(65) Prior Publication Data

US 2016/0303817 A1    Oct. 20, 2016

(30) Foreign Application Priority Data

Apr. 17, 2015 (CH) ......................................... 540/15

(51) Int. Cl.
| | |
|---|---|
| *B30B 11/02* | (2006.01) |
| *B30B 15/06* | (2006.01) |
| *B30B 15/02* | (2006.01) |
| B30B 11/04 | (2006.01) |
| F16B 1/00 | (2006.01) |

(52) U.S. Cl.
CPC ............ *B30B 15/026* (2013.01); *B30B 11/02* (2013.01); *B30B 15/028* (2013.01); *B30B 15/065* (2013.01); *B30B 11/04* (2013.01); *F16B 2001/0035* (2013.01)

(58) Field of Classification Search
CPC ....... B30B 11/02; B30B 11/04; B30B 15/026; B30B 15/028; B30B 15/065; B22F 3/03
See application file for complete search history.

(56) References Cited

U.S. PATENT DOCUMENTS

| 2,819,905 A | 1/1958 | Stead |
|---|---|---|
| 8,496,458 B2 * | 7/2013 | Casperson ................ B22F 3/03 425/193 |

FOREIGN PATENT DOCUMENTS

| DE | 9012752 U1 | 11/1990 |
|---|---|---|
| EP | 2 033 722 A1 | 11/2009 |
| WO | 2011061686 A1 | 5/2011 |

OTHER PUBLICATIONS

Switzerland International Search Report corresponding to Switzerland application No. 000540/15 (2 pages).

\* cited by examiner

*Primary Examiner* — James Mackey
(74) *Attorney, Agent, or Firm* — Maginot, Moore & Beck, LLP

(57) ABSTRACT

The assembly comprises a coupling for direct or indirect coupling the core rod (15) to the lower punch (12) of a powder press. The coupling is configured as a magnetic coupling and comprising two coupling elements (20, 30), the first (20) of which is actively connected to the core rod (15) and the second (30) of which is actively connected to the lower punch (12). The magnetic coupling comprises several permanent magnets (24a, 24b, 33a, 33b) arranged at each coupling element. These permanent magnets (24a, 24b, 33a, 33b) are arranged and adapted to each other such that when coupling the two coupling elements (20, 30) the first coupling element (20) is automatically rotated by the effect of the field lines of the magnets (24a, 24b, 33a, 33b) into a predetermined angular position relative to the second coupling element (30).

15 Claims, 6 Drawing Sheets

POWDER PRESS ASSEMBLY

This application claims priority to Swiss Application No. 00540/15, entitled "Powder Press Assembly", filed in the name of the same inventor and applicant on Apr. 17, 2015, the entire disclosure of which is incorporated herein by reference.

The invention relates to a powder press assembly comprising at least one lower punch and a core rod. Powder presses of the type involved in the present context generally feature in addition to the cited lower punch and the core rod also an upper punch and a die disposed inbetween as the shaping tool. The core rod serves to provide in the pressed part—compact—a recess or opening.

When a powder press is required to produce parts differingly shaped, then it is usually the case that that the upper punch, the die, the lower punch and also the core rod all have to changed. Presently this change is done automated, for example by means of a robotic manipulator. Whilst the upper punch, the die and also the lower punch are generally accessible, i.e. grippable, changing the core rod is difficult since this is usually arranged in a lower or lowest plane which in most cases is inaccessible for a robotic manipulator, especially since the core rod extends in addition into the lower punch or is arranged coaxially thereto, rendering its removal even more difficult.

Since the core rod needs to be movable in relation to the lower punch it is also not possible to fixedly interconnect the two components to be removed or replaced both together from the press.

Known from EP 2 033 722 is a die press assembly comprising a lower punch holder for holding a lower punch, a die holder for holding a die and a core rod connector for holding a core rod. The lower punch, the die as well as the core rod are provided with a drilled hole for mounting a radial locking pin. To radially move (actuate) the locking pin an actuator is provided in the form of a piston powered by compressed air. The locking device is provided with an end part configured to directly cooperate with a finger of a robotic manipulator. By means of the locking pin the lower punch, the die and the core rod can be connected together with the corresponding holders such that the cited parts can be removed from the powder press as a single assembly.

The WO 2011 061686 discloses a magnetic holder for holding metallic workpieces during machining in a medium. As evident from FIGS. 4A and 4B the holder comprises in addition to a central permanent magnet, five further permanent magnets inserted in blind holes and closed off sealed by means of plugs. The magnets serve to hold a crown wheel whilst the single magnet serves to hold a sprocket. By means of such a holding device the workpieces being machined can be inserted in a medium for example a slide grinding machine. The prerequisite for such a holder to function is that the workpieces are made of a ferromagnetic material.

The object of the present invention is to propose a powder press in the generic field as cited above which is simply structured whilst permitting automated removal of the core rod from the powder press as well as automated insertion of the core rod in the powder press.

This object is achieved by the features as set forth in claim 1. In accordance with the invention the assembly comprises a coupling for direct or indirect coupling the core rod to the lower punch, the coupling being configured as a magnetic coupling and comprising two coupling elements, the first of which is actively connected to the core rod and the second of which is actively connected to the lower punch. This configuration now makes it possible to achieve, for one thing, a relative movement between the core rod and the lower punch, since to separate the coupling in addition to the weight of the element itself only the force of attraction of the magnets of the magnetic coupling needs to be overcome. For another, the magnetic coupling now makes it possible that due to the force of attraction of the magnet(s) the lower punch can now be removed together with the core rod. It is understood that the magnets, namely their number, positioning and force of attraction are selected according to the requirements in each case.

In one preferred embodiment the assembly comprises a pallet carrying the lower punch whilst the second coupling element is connected to the pallet carrying the lower punch. This configuration permits speedy removal of the lower punch together with the core rod and a repeatedly precise insertion of the lower punch and the core rod into the powder press.

Preferably the magnetic coupling comprises a permanent magnet mounted on a coupling element and at least one permanent magnet or ferromagnetic material mounted on the other coupling element. Permanent magnets are cost-effective, require no maintenance and are available is a wealth of different shapes and sizes.

Particularly preferred, the magnetic coupling comprises several permanent magnets mounted on each coupling element. This enables a symmetrical arrangement to be achieved and the force of attraction of the magnets can be varied in accordance with the pertinent requirements.

In another particularly preferred embodiment the magnetic coupling is configured in such a way that due to the permanent magnet(s) in coupling the two coupling elements the first coupling element can be positioned relative to the second coupling element precisely angled. In this way the core rod is positioned correctly angled when being coupled to the lower punch or pallet.

In yet another particularly preferred embodiment it is provided for that the first coupling element is provided, facing the second coupling element, with one end in which at least one permanent magnet or a ferromagnetic material is indented to form the one coupling half of the magnetic coupling. Such a configuration is both simple and cost-effective to achieve.

In yet a further particularly preferred embodiment the second coupling element comprises facing the first coupling element one end in which at least one permanent magnet or a ferromagnetic material for forming the other coupling half of the magnetic coupling is indented. In this way the end together with the magnet(s) can be simply and cost-effectively adapted to each other and each magnet is able to develop its optimum effect as regards its opposite (magnet or ferromagnetic material) arranged in the opposite end.

Preferably several permanent magnets are indented in the end of each coupling element, the coupling element comprising permanent magnets diversely polarized which are adapted to the permanent magnets of the other coupling element comprising poles likewise diversely polarized such that the first coupling element is rotatable automatically into another angular position relative to the second coupling element due to the effect of the field lines of magnets. This configuration has proven to be particularly favourable as regards orienting the first coupling element relative to the second coupling element correctly angled, especially since the one coupling element according to the other coupling element is able to rotate about a comparatively large angle.

In still another particularly preferred embodiment the first coupling element is configured in the form of a sleeve portionally surrounding the core rod and the second coupling element is provided with a coupling half for insertion of the core rod. Such a sleeve achieves, on the one hand, a simple and speedy means of securing the sleeve to the core rod, whilst on the other hand, in this configuration the two coupling elements are oriented coaxially relatively to each other by the core rod.

Particularly preferred the first and second coupling elements are mainly made of a non-magnetic material to permit preventing any influence of the permanent magnet(s).

In a further preferred embodiment it is provided for that the magnetic coupling additionally comprises mechanical means for orienting the first coupling element relative to the second coupling element. This configuration permits orienting the one coupling element relative to the other by mechanical means.

In another preferred embodiment the second coupling element is provided with radial projections by means of which it is rendered positionable correctly angled in recesses of the pallet for fixedly locating the lower punch. This enables recesses mostly provided in the pallet, especially the centering grooves to be correctly angled positioned in use. Where the pallet is sensed defined in position, for example by a robotic manipulator the angular position of the second coupling element can simultaneously also be defined.

In yet a further particularly preferred embodiment the second coupling element comprises pliant tongues provided with detents so that the second coupling element can be clamped fixed in place relative to a corresponding angular groove of the pallet. This configuration permits speedy and simple means of securing the second coupling element to the pallet. When the core rod is provided with a coupling half, as explained above, the pliant tongues can no longer be retracted radially due to insertion of the core rod in the coupling half. Preferably the core rod is adapted to the hole or respectively the pliant tongues that the latter are urged radially outwards so that a positive connection to the pallet of the lower punch is achieved.

In conclusion, again in a particularly preferred embodiment, the pallet is provided with at least one recess and/or projection configured to permit gripping by a robotic manipulator. This particularly promotes automated retrieval of the pallets together with the lower punch and the core rod from the powder press, respectively insertion of same into the powder press.

A further object of the invention involves providing a powder press comprising an upper punch, a die, a lower punch fixedly clampable by means of a pallet in a lower punch chuck as well as a core rod fixedly clampable in a core rod chuck wan assembly as set forth in any of the claims 1 to 14, so as to achieve automated speedy replacement of the core rod.

Achieving this object is defined by the features of claim 15. By definition the core rod is connected directly or indirectly to a first coupling element, whilst the lower punch is connected directly or indirectly to a second coupling element, this assembly comprising at least one magnetic coupling featuring permanent magnets for coupling the two coupling elements.

The invention will now be described in detail by way of a preferred example embodiment with reference to the drawings in which.

Like parts in the FIGs. are identified by like reference numerals.

Figure 1:
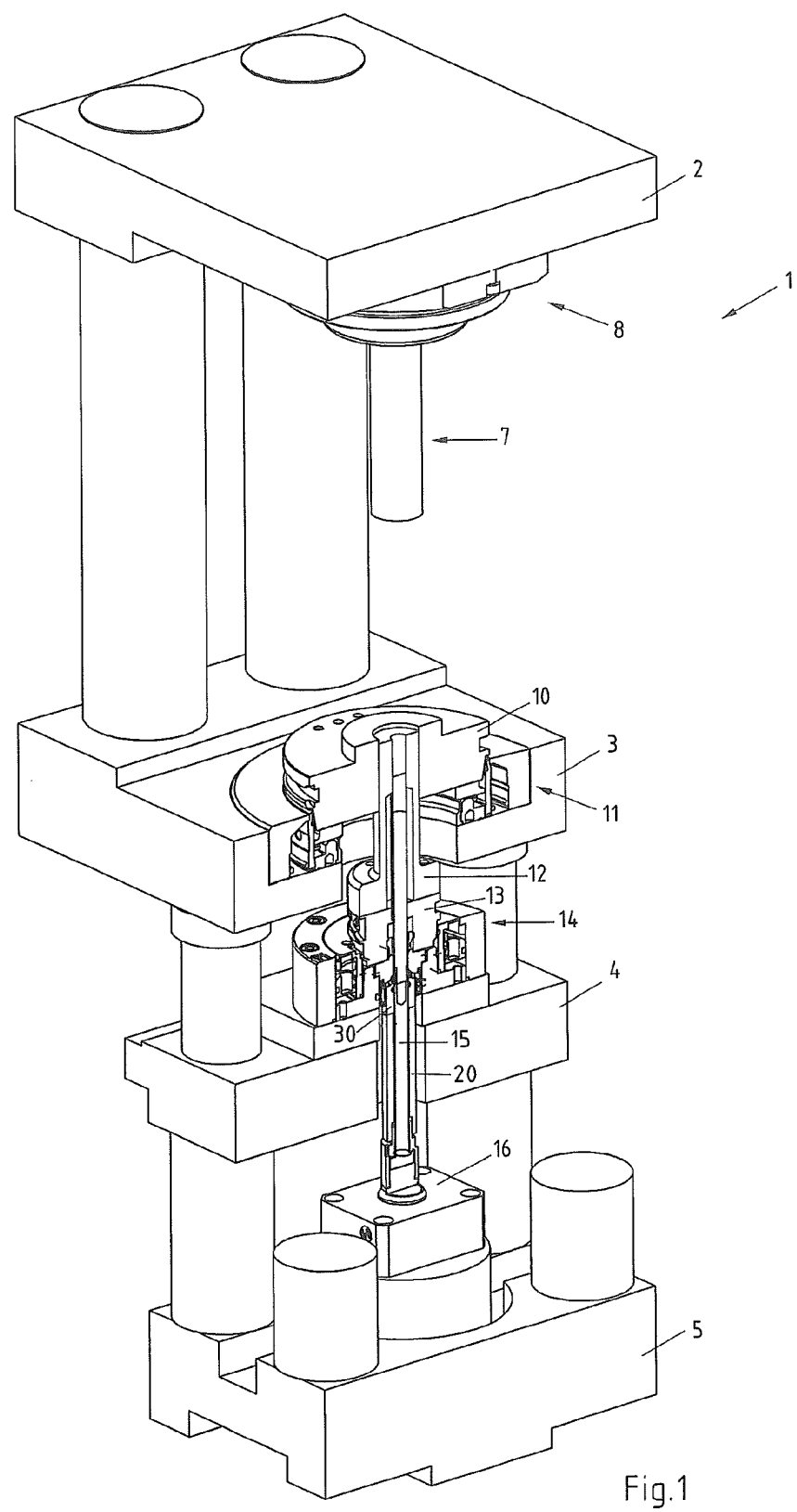
FIG. 1 is a diagrammatic view in perspective of a powder press together with the assembly for coupling the core rod to the lower punch.

Referring now to FIG. 1 there is illustrated a diagrammatic view in perspective of a powder press together with the assembly for coupling the core rod to the lower punch, respectively a pallet carrying the lower punch in a partly sectioned view. Since generic powder presses are known in general, the following details only the most important components or a few elements relevant in conjunction with the invention.

In a top-down view the powder press 1 comprises an upper plate 2, a die plate 3, a lower plate 4 as well as a footplate 5. The plates are interconnected by means of a press frame not detailed. Usually one of the cited plates is fixedly connected to the press frame dead, for example the die plate 3 whilst the other plates are live vertically.

Fixedly connected to the upper plate 2 is an upper punch 7 by means of a first chuck "upper punch chuck 8" and to the die plate 3 a die 10 by means of a second chuck "die chuck 11". Fixedly connected to the lower plate 4 is a lower punch 12 by means of a third chuck "lower punch chuck 14" whilst, to finish with, fixedly connected to the footplate 5 is a core rod 15 by means of a fourth chuck "core rod chuck 16". Preferably the lower punch 12 is also used to eject the pressed article from the die 10. By means of the cited chucks each element belonging thereto can be fixedly secured to the corresponding plate and, when required, also removed therefrom. Usually the upper punch 7 and the lower punch 12 are secured to a pallet provided with positioning elements for example in the form of grooves. Each pallet can then be fixedly clamped precisely positioned in the corresponding chuck. The assembly for coupling the core rod 15 to the lower punch 12 comprises a coupling with two coupling elements 20, 30, the first of which, coupling element 20, is connected to the core rod 15 and the second coupling element 30 to the pallet 13 carrying the lower punch 12 as detailed further on. Thus, the first coupling element 20 is actively connected to the core rod 15 and the second coupling element 30 to the lower punch 12. To permit coupling the core rod 15 to the lower punch 12 respectively the pallet 13 the coupling is configured as a magnetic coupling comprising a plurality of permanent magnets. How the magnetic coupling is configured and works is detailed further on.

Figure 2:
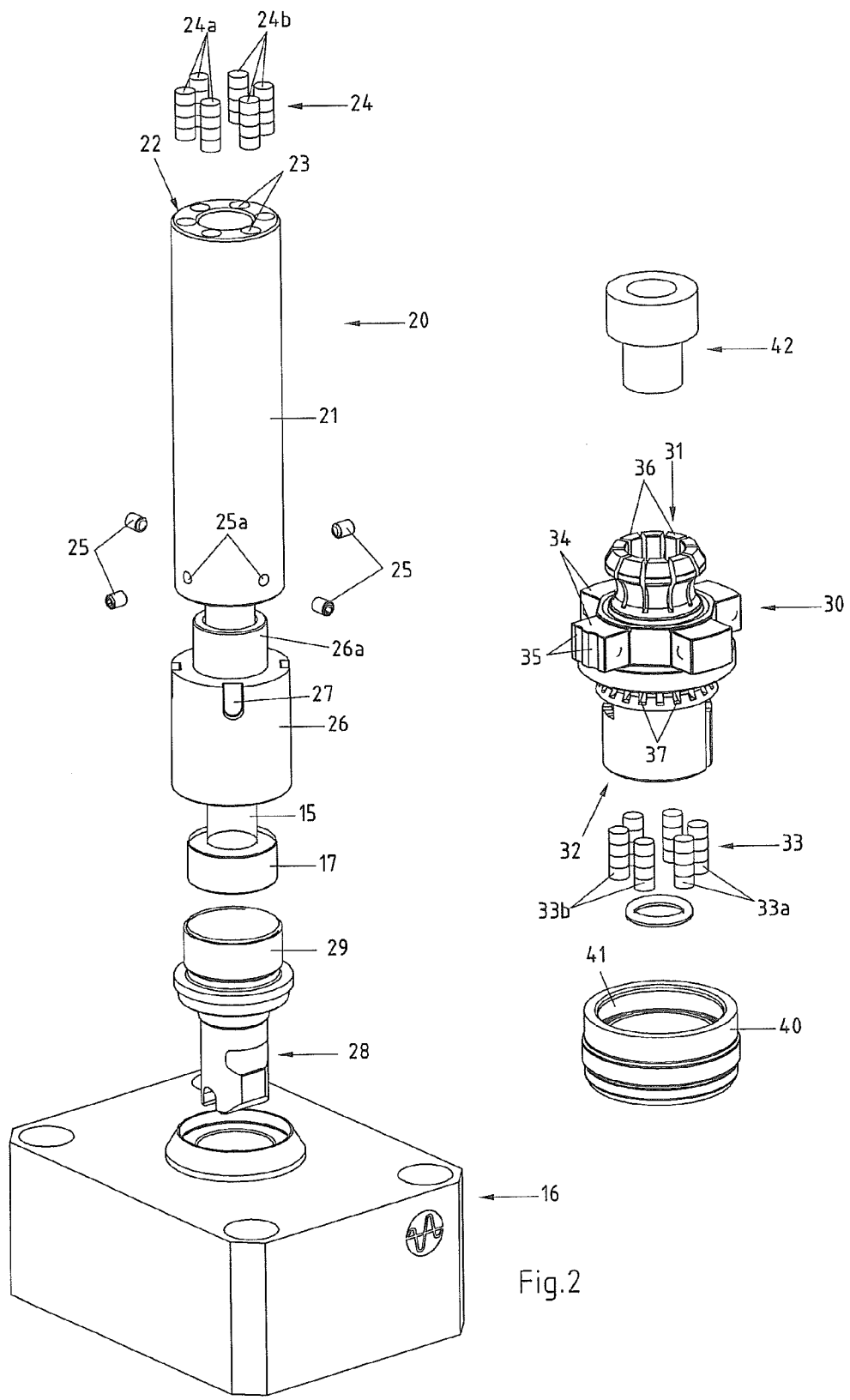
FIG. 2 is a view in perspective of elements of the assembly together with further components.

Referring now to FIG. 2 there is illustrated in an exploded view in perspective the two coupling elements 20, 30 together with the underpart of the core rod 15, the fourth chuck 16 for fixedly clamping the core rod 15 as well as further elements.

In addition to the two coupling elements 20, 30 there is shown a cylindrical projection 17 arranged at the underside of the core rod 15, a clamping spigot 28 with a male-threaded cylindrical upper part 29, a sealing element 42 as well as a ring element 40.

The first coupling element 20 comprises a sleeve 21 which is connected by means of the aforementioned pallet to the core rod 15. The sleeve 21 coaxially surrounds the core rod 15 and is made of a non-magnetic material such as, for example, aluminium or plastics. The first coupling element 20 comprises annular ends top and bottom, the upper end 22 having six holes 23 for mounting six permanent magnets 24. The six permanent magnets 24 are inserted in the holes 23 such that three each juxtaposed magnets 24a respectively 24b have the same polarity, three magnets 24a having the north pole facing upwards whilst the three other magnets 24b each have the south pole facing upwards.

The first coupling element 20 comprises in addition a fastener nut 26 featuring slotted recesses 27 for attachment of a fastening tool—hook spanner—for tightening the fastener nut 26. Machined in the sleeve 21 are tappings 25a for screwing in grub screws 25, by means of which the sleeve 20 can be fixedly secured to an upper cylindrical collar 26a of the fastener nut 26. The fastener nut 26 together with the upper cylindrical collar 26a is made in one piece. By means of a female thread (not shown) the fastener nut 26 is in turn screwed on to the male thread of the cylindrical upper part 29 of the clamping spigot 28. In addition, the fastener nut 26 also serves to connect the clamping spigot 28 to the core rod 15 by the fastener nut 26 engaging by an inner ridge (not shown) the top end of the cylindrical projection 17 of the core rod 15 urging it against the flat of the cylindrical upper part 29 of the clamping spigot 28.

At its underside the clamping spigot 28 is provided with recesses for positioning and fixedly attaching the core rod chuck 16. Since such clamping spigots 28 are known in general they are not detailed here.

The second coupling element 30 is likewise made of a non-magnetic material, preferably plastics and is provided with a central through-hole 31. The diameter of the central through-hole 31 is adapted to the outer diameter of the core rod 15 so that the core rod 15 is located in a snug fit by the first coupling element 30, but is able to rotate in the central through-hole 31. The second coupling element 30 is likewise arranged coaxially to the core rod 15. Provided on the underside, which in the secured condition faces the first coupling element 20, the second coupling element 30 is provided with a flat end 32 in which 6 holes (not shown) are drilled for receiving six magnets 33. In this arrangement the six magnets 33 are inserted in the holes such that three juxtaposed magnets 33a respectively magnets 33b have the same polarity in each case, three magnets 33a in each case feature the north pole facing upwards whilst the three further magnets 33b feature the south pole facing upwards.

The second coupling element 30 is topped by four radial projections 34 serving to position the coupling element at the underside of the pallet as is explained further on. In the one of these radial projections 34 indentations 35 are machined. These indentations 35 represent an optical orienting aid for positioning the second coupling element 30 correctly angled to the pallet. Positioning and orienting the magnets 33a, 33b is preferably adapted to the indentations 35.

The second coupling element 30 is topped by pliant tongues 36 in the sense of a clamping sleeve, the pliant tongues 36 feature catches by means of which the second coupling element 30 is fixably located in a hole or in an annular groove of the pallet machined in the hole. Provided underneath the projections 34 the second coupling element 30 is provided with radial slots 37 which lead outwards from the through-hole 31. In addition, a ring element 40 is evident which from underneath can be urged against the coupling element 30. On its inner side the ring element 40 features a circumferential coupling half in the form of an annular groove 41 serving to receive powder particles which are able to exit via the radial slot 37 of the second coupling element 30. In conclusion a sealing element 42 is evident which is inserted from the top into the through-hole 31 of the second coupling element 30. Any seals and O rings for sealing and, where necessary, fixedly locating the second coupling element 30 as well as the ring element 40 are not shown.

The permanent magnets 24a, 24b of the first coupling element 20 are arranged and polarized adapted to that of the permanent magnets 33a, 33b of the second coupling element 30 so that the second coupling element 30 when coupled assumes a defined angular position relative to the first coupling element 20.

Figure 3:
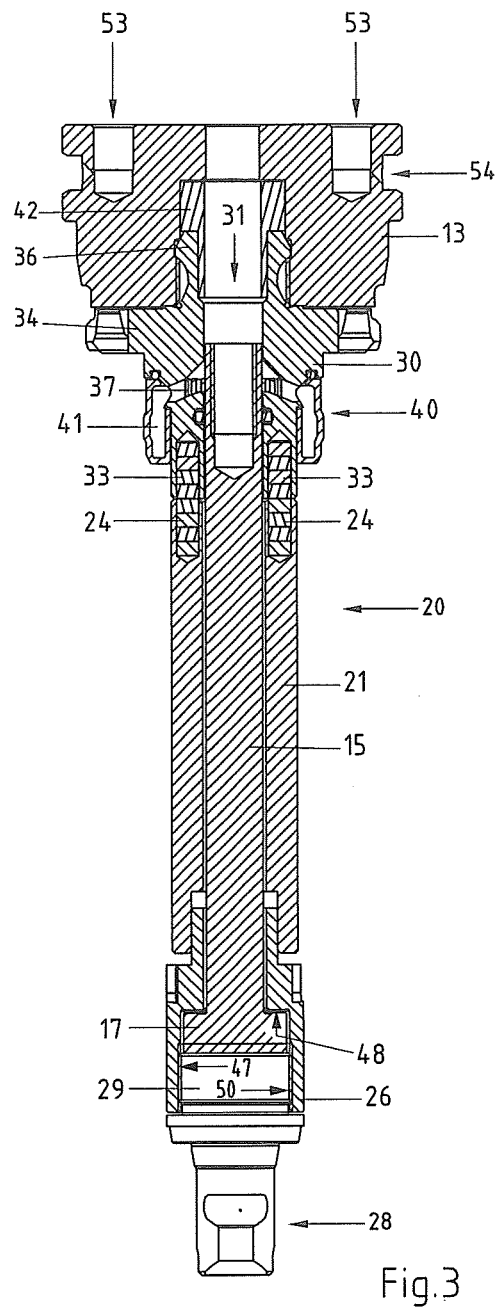
FIG. 3 is a sectional view through the assembly for coupling the core rod to the lower punch together with the core rod and a pallet.

Referring now to FIG. 3 there is illustrated a sectional view through the assembly for coupling the core rod 15 to the lower punch respectively the pallet 13. The lower punch to be secured topping the pallet 13 is not indicated in this drawing. For securing the lower punch the pallet 13 features tappings 53 which are recessed in the flat top face of the pallet 13.

The second coupling element 30 is fixedly located to the pallet 13 by the catches of the pliant tongues 36 engaging an inner circumferential annular groove of the pallet 13. The first coupling element 20 is coupled by means of the attraction of the magnets 24, 33 to the second coupling element 30. The magnets 24, 33 are dimensioned such that their attraction is sufficient to ensure that the first coupling element 20 together with the further elements such as particularly the core rod 15 are securely mounted—carried—and also safely transported.

Also evident in this drawing is the sealing element 42 which seals off the second coupling element 30 upwards such that any soilage, particularly powder particles cannot escape radially, but instead can only drop down in the direction of the central through-hole 31 of the second coupling element 30. Provided beneath the radial projections 34 the second coupling element 30 is provided with radial slots 37 which exit from the central through-hole 31. Evident furthermore is the ring element 40 which is urged from underneath against the second coupling element 30. Also evident circumferentiated in the ring element 40 is the annular groove 41 which especially serves to receive any powder particles able to emerge via the radial slots 37 of the second coupling element 30.

Where the core rod 15 is provided topped (not shown) the second coupling element 30 can no longer be removed from the pallet 13 since the cited topping of the core rod 15 extends through the through-hole of the second coupling element 30 and the pliant tongues 36 are no longer able to yield inwardly. Preferably the topping of the core rod 15 is adapted to the central through-hole 31 respectively the pliant tongues 36 that the latter are radially urged outwards so that a positive connection materializes with the pallet 13 of the lower punch.

The fastener nut 26 is screwed on by means of the female thread 47 on the male thread 50 of the cylindrical upper part 29 of the clamping spigot 28, the clamping spigot 28 not being depicted in a sectioned view. The fastener nut 26 connects simultaneously the clamping spigot 28 to the core rod 15 by the latter by means of an inner shoulder 48 urging the cylindrical projection 17 of the core rod 15 against the flat of the cylindrical upper part 29 of the clamping spigot 28. The sleeve 21 of the first coupling element 20 is connected by means of the grub screws 25 (FIG. 2) to the fastener nut 26 and thus also to the core rod 15.

Figure 4:
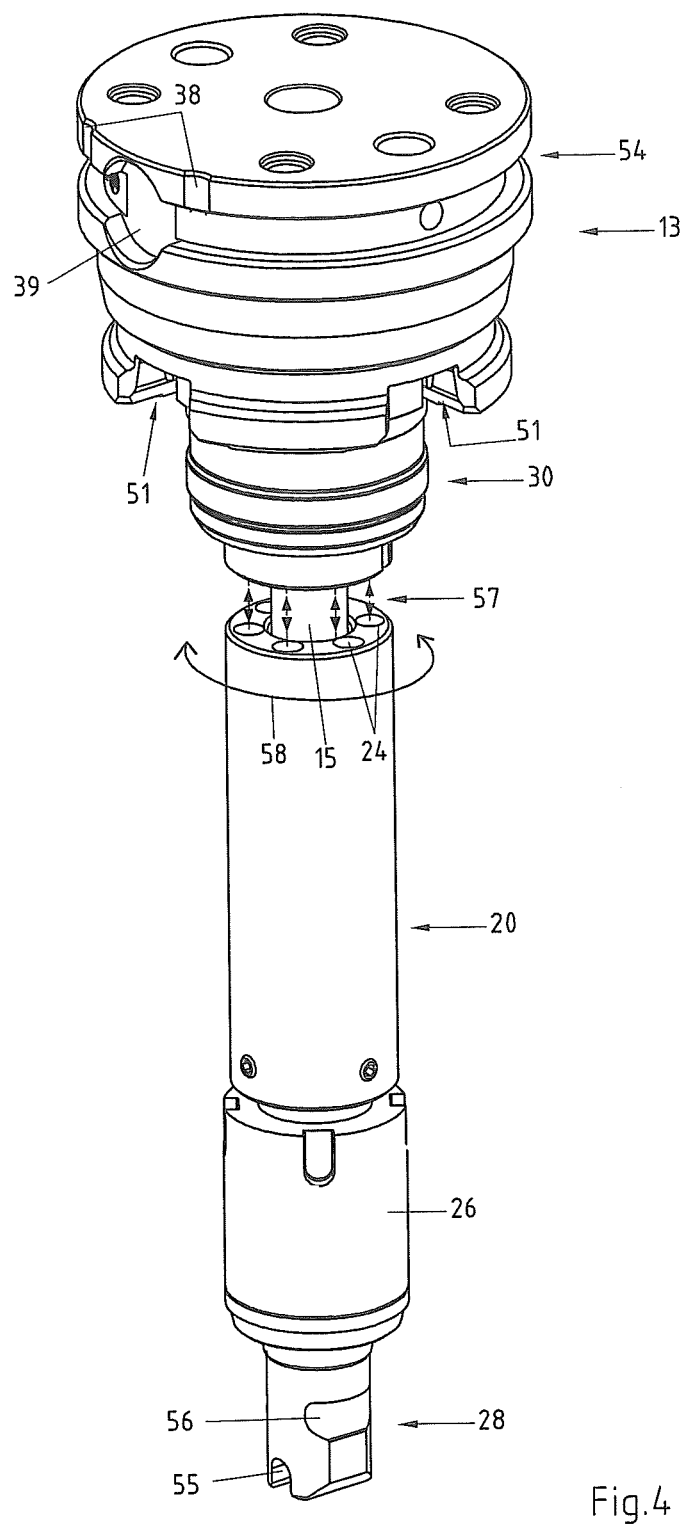
FIG. 4 is a view in perspective of the assembly for coupling the core rod to the lower punch.

By means of the pliant tongues 36 the second coupling element 30 can be simply and speedily fixedly connected to the pallet 13 and after extension of the core rod can also be removed, Referring now to FIG. 4 there is illustrated a view in perspective of the assembly for coupling the core rod 15 to the lower punch together with the pallet 13 to mount the lower punch. Of the core rod 15 itself only a small portion between the two coupling elements 20, 30 is evident. The assembly and orientation of the permanent magnets 24 of the coupling elements 20 to the permanent magnets (not shown) of the second coupling element 30 is selected so that the two coupling elements 20, 30 are coupled to each other by the attraction of the opposite poles respectively the force rejecting the same poles in a predetermined position to each other, so that the core rod 15 respectively its clamping spigot 28 after coupling the first coupling element 20 to the second coupling element 30 assumes a predetermined angular groove position in relation to the pallet 13. The lines of force of the magnets are indicated diagrammatically by double arrows 57. But in any case the magnets are arranged and dimensioned such that the first coupling element 20 in relation to the second coupling element 30 by the effect of the magnets can execute a relative movement in the one or other direction so that the first coupling element 20 on being secured to the second coupling element 30 needs only to be roughly positioned to then rotate by the effect of the magnets in a predetermined angular groove position relative to the second coupling element 30. Depending on the number, arrangement and strength of the magnets the angle varies about which the one coupling element is able to rotate by itself on being secured to the other coupling element. Preferably an orientation by itself by at least a few angular groove degrees should always be possible.

When the two coupling elements 20, 30 come together and the first coupling element 20 is "released" propositioned, the first coupling element 20 rotates by itself into a predetermined angular groove position in relation to the second coupling element 30 due to the effect of the field lines of the magnets. For this purpose in any case the core rod 15 is rotatable in the through-hole of the second coupling element 30.

Since the robotic manipulator grips the pallet 13 in a defined position, after the coupling of the first coupling element 20 also the orientation of the clamping spigot 28, namely its recesses 55, 56 which is important so that the core rod 15 can be fixedly clamped in the core rod chuck automatically, particularly fully-automatically. A further double arrow 58 signifies the rotation of the first coupling element 20 on being coupled to the second coupling element 30, after which, of course, also the angular position of the top part of the core rod 15 relative to the pallet 13 is defined which may be particularly important when the top end thereof to be inserted in the pressed item is not symmetrical. The pallet 13 is bottomed by centering grooves 51 by means of which the pallet 13 is oriented with high precision when fixedly clamping at the chuck in the X and Y direction as well as relative to the angular groove position about the Z axis. The pallet features in addition reference marks 38 by means of which their angular groove position is evident whilst permitting a defined position in relation to the chuck, all the more so since the pallet can be rotated in steps of 90° by the lower plate 4 grooves relative to the chuck. The reference marks 38 can also be put to use in positioning the second coupling element 30, for example, by aligning the indentations 35 (FIG. 2) machined in a radial projections 34 of the second coupling element 30 to the reference marks 38. In addition the pallet 13 features a recess 39 serving to mount a memory chip for storing indications as to the lower punch and/or core rod, for example.

Figure 5:
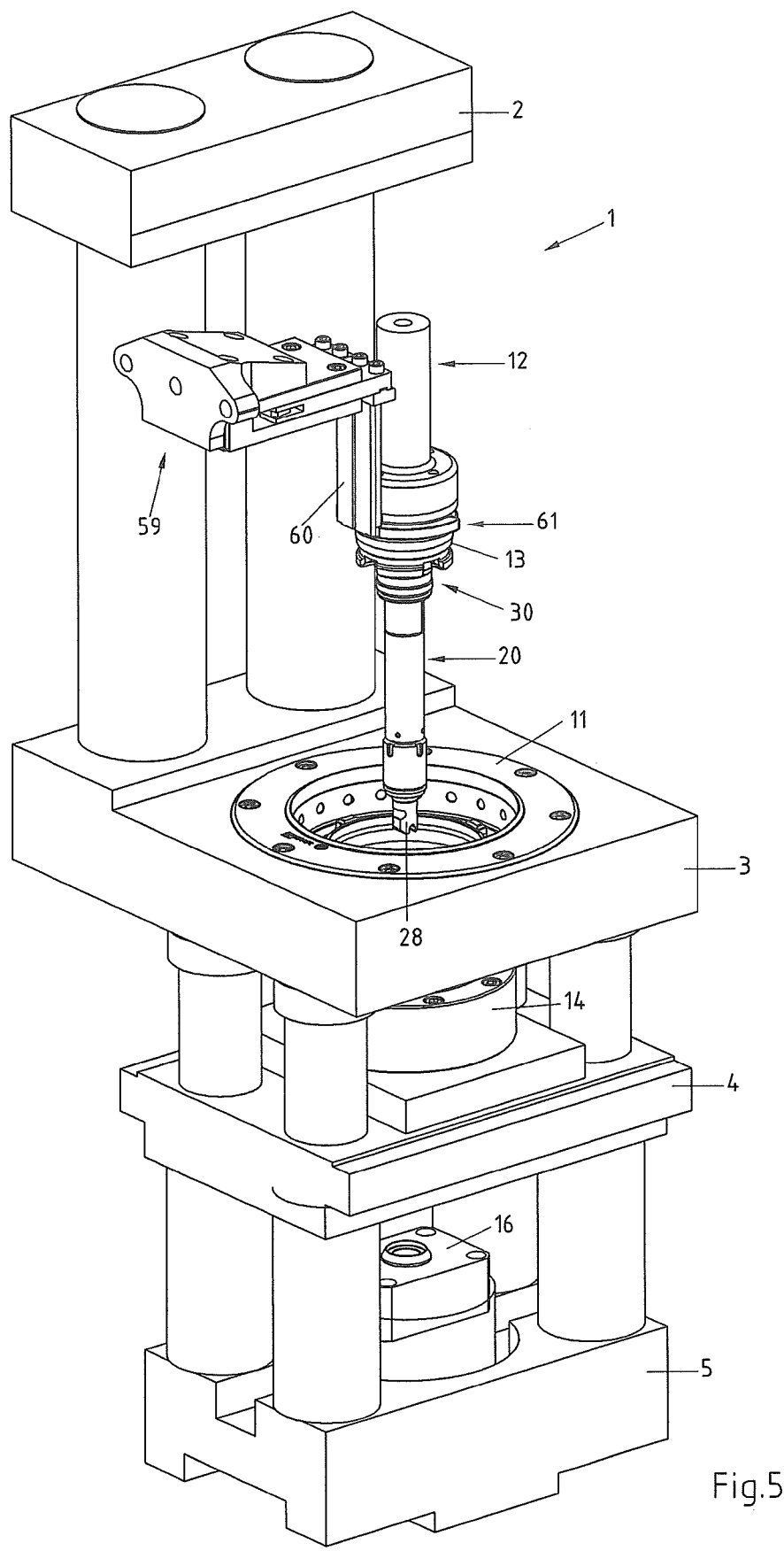
FIG. 5 is a view of the powder press as shown in FIG. 1 together with a robotic manipulator holding the assembly.

Referring now to FIG. 5 there is illustrated the powder press 1 as shown in FIG. 1 together with a robotic manipulator 59 in a diagrammatic representation in which of the upper plate 2 of the powder press 1 only the rear part is illustrated. To insert/remove the lower punch 12 together with the core rod (not shown) in/from the powder press 1 the robotic manipulator 59 manipulates the pallet 13 as shown. As explained previously the core rod is connected by the two coupling elements 20, 30, namely by the effect of the magnets of the magnetic coupling to the pallet 13 and the lower punch 12 so that the core rod can be extracted from the powder press 1 and also returned therein by the robotic manipulator 59 manipulating the pallet 13. The robotic manipulator 59 preferably features an angular element 60 offset downwards at the bottom end of which a manipulator comprising two fingers 61 is arranged, whereby the fingers 61 engage the groove in the pallet 13 as defined. The fingers 61 of the robotic manipulator 59 can be travelled through the die chuck 11 downwards until roughly level with the lower punch chuck 14. In the core rod chuck 16 arranged at the footplate 5 the core rod can then be fixedly clamped in place by means of the clamping spigot 28. Since the robotic manipulator 59 manipulates the pallet 13 defined in position, the orientation of the clamping spigot 28 including its recesses in relation to the pallet 13 as well as to the corresponding positioning and clamping elements of the core rod chuck 16 are known.

On insertion of the core rod into the powder press 1 the robotic manipulator 59 travels so far down that the clamping spigot 28 of the core rod enters the core rod chuck 16 fixedly clamping the clamping spigot 28 in place in the core rod chuck 16. It is understood that for this to happen the 14 needs to be lowered to such an extent in relation to the core rod chuck 16 that this is made possible. In addition a large enough vertical spacing between the die plate 3 and the upper plate 2 is needed so that the lower punch 12 together with the core rod can be inserted sideways into the powder press 1 and the components in each case can be fixedly clamped in place in the corresponding chuck 14,16. The necessary vertical spacing between the die plate 3 and the upper plate 2 can be achieved by lifting the upper plate 2 and/or lowering the die plate 3.

After the lower punch 12 together with the core rod has entered the powder press 1 in being lowered, either the pallet 13 is firstly fixedly clamped in place in the lower punch chuck 14 or the core rod in the lower punch chuck 14. It is usually the case that the sequence is selectable. After the pallet 13 is fixedly clamped in place in the lower punch chuck 14 the robotic manipulator 59 can in any case be extended. As soon as in addition to the pallet 13 also the core rod 15 is fixedly clamped in place in the corresponding chuck 16, the lower punch 12 together with the core rod 15 ready for a pressing action. Pressing itself can be started as soon as in addition the die and the upper punch are in place and the corresponding parameters of the press are adapted to the tool combination employed. In any case any downstream systems such as e.g. weighing and camera systems, etc. have to be adapted to the new process parameters. To retrieve the pallet 13 together with the lower punch 12 and the core rod from the powder press a reverse sequence is selected.

Figure 6:
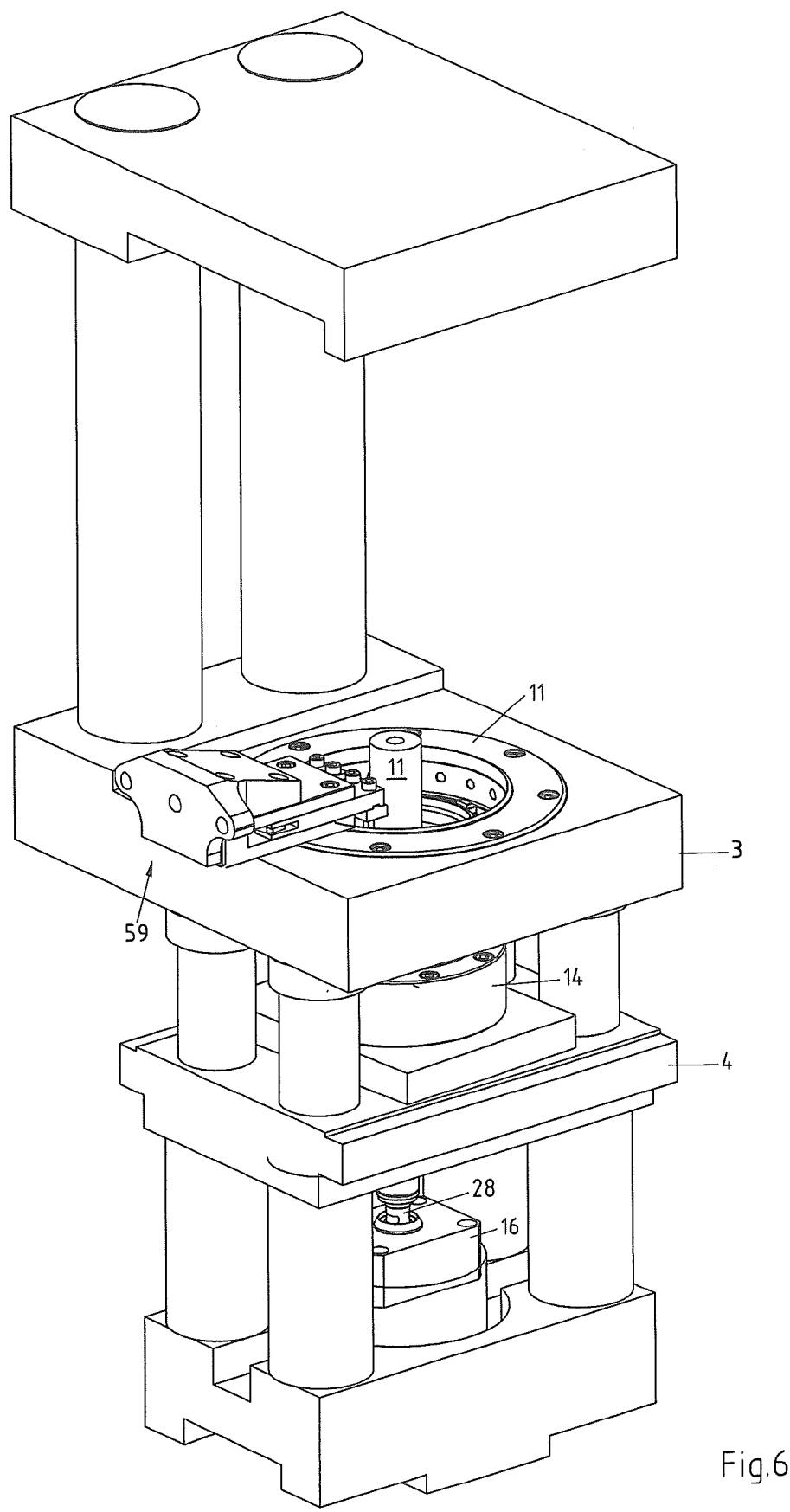
FIG. 6 is a view of the robotic manipulator as shown in FIG. 1 in another position.

Referring now to FIG. 6 there is illustrated the robotic manipulator 59 in a lowered position in which the clamping spigot 28 of the core rod is inserted into the core rod chuck 16. The pallet 13 may already be fixedly clamped in place in the lower punch chuck 14 or first the core rod is fixedly clamped in place in the core rod chuck 16 and the pallet 13 fixedly clamped in place thereafter.

As soon as the pallet carrying the lower punch and the core rod is fixedly clamped in place in the corresponding chucks 14, 16 the core rod can be moved in relation to the lower punch 12 in the vertically. For this to happen, in addition to the forces, the force of attraction of the magnets must also be overcome, of course.

The advantages afforded by any assembly engineered in accordance with the invention can be summarized as follows:

- cost-effective solution for automatically feeding a core rod into a powder press or its automated removal;
- a simple achievement without complicated mechanical features;
- universal in application since practically independent of how the powder press as well as the lower punch and the core rod are dimensioned;
- retrofittable to existing powder presses;
- simple and speedy alignment of the core rod to the corresponding chuck;
- core rod can be separated speedily and simply from the lower punch or from the pallet carrying the lower punch;
- the assembly can be dimensioned in accordance with requirements so that diverse core rods can be combined with corresponding lower punches;
- the core rod can be stored and put to use independently of the lower punch;
- the assembly comprises no moving parts;
- no power supply is needed for the assembly.

It is understood that the example embodiment as explained mainly with reference to the drawings is not at all to be considered as being finalized, but that in the scope of protection afforded by the claims of the patent configurations deviating from the example embodiment as explained are definitely possible. Thus, for example, the first coupling element could involve a sleeve which is directly connected to the core rod. The second coupling element too, could also be directly connected to the lower punch. The configuration of the magnetic coupling may very well deviate from the example shown. Thus for example the number and arrangement of the magnets may be varied, it merely being important that the magnetic coupling features at least one magnet, preferably several permanent magnets permitting a direct or indirect coupling of the core rod to the lower punch. And, of course, permanent magnets may be employed which, for example, are fully circular or only partly so. In addition to one or more permanent magnets the magnetic coupling may also comprise ferromagnetic materials acting together with the magnet(s). In addition to the magnetic coupling comprising one or more permanent magnets the assembly may also feature mechanical means for aligning the core rod relative to the lower punch or the first coupling element relative to the second coupling element. Such mechanical means may include for example projections and/or recesses. Mechanical means of alignment for example in the form of a pin make for good engineering especially when magnets are arranged on one coupling element only and cooperate with ferromagnetic materials arranged on the other coupling element. In this case also the main body—sleeve 21—or at least the upper end 22 of the coupling elements 20 could be made of a ferromagnetic material.

What is claimed is:

1. A powder press assembly including at least one lower punch and a core rod, the assembly comprising a coupling for direct or indirect coupling the core rod to the lower punch, wherein the coupling is configured as a magnetic coupling and includes two coupling elements, the first coupling element of which is actively connected to the core rod and the second coupling element of which is actively connected to the lower punch.

2. The assembly as set forth in claim 1, wherein said assembly further comprises a pallet carrying the lower punch whilst the second coupling element is connected to the pallet carrying the lower punch.

3. The assembly as set forth in claim 1, wherein said magnetic coupling includes a permanent magnet mounted on one of said two coupling elements and at least one permanent magnet or ferromagnetic material mounted on the other of said two coupling elements.

4. The assembly as set forth in claim 3, wherein each of the two coupling elements is provided with several permanent magnets.

5. The assembly as set forth in claim 3, wherein said magnetic coupling is configured in such a way that due to the permanent magnet(s) in coupling the two coupling elements the first coupling element can be positioned relative to the second coupling element at a predetermined precise angle.

6. The assembly as set forth in claim 1, wherein said first coupling element is provided, facing the second coupling element, with one end in which at least one permanent magnet or a ferromagnetic material is indented to form one coupling half of a magnetic coupling.

7. The assembly as set forth in claim 6, wherein said second coupling element comprises facing the first coupling element one end in which at least one permanent magnet or a ferromagnetic material for forming another coupling half of the magnetic coupling is indented.

8. The assembly as set forth in claim 7, wherein several permanent magnets are indented in the end of each coupling element, first coupling element including permanent magnets diversely polarized which are adapted to the permanent magnets (33$a$, 33$b$) of the other second coupling element including poles likewise diversely polarized such that the first coupling element is rotatable automatically into another angular position relative to the second coupling element due to the effect of the field lines of magnets.

9. The assembly as set forth in claim 1, wherein said first coupling element is configured in the form of a sleeve portionally surrounding the core rod and the second coupling element is provided with a central through-hole for the core rod.

10. The assembly as set forth in claim 1, wherein said first and second coupling elements are made of a non-magnetic material.

11. The assembly as set forth in claim 1, wherein said assembly additionally comprises mechanical means for orienting the first coupling element relative to the second coupling element.

12. The assembly as set forth in claim 2, wherein said second coupling element is provided with radial projections configured to render the second coupling element positionable correctly angled in recesses of the pallet for fixedly locating the lower punch.

13. The assembly as set forth in claim 2, wherein said second coupling element comprises pliant tongues provided with detents so that the second coupling element can be clamped fixedly in place in a corresponding angular groove of the pallet carrying the lower punch.

14. The assembly as set forth in claim 2, wherein said pallet carrying the lower punch 12 is provided with at least one recess and/or projection configured to permit gripping by a robotic manipulator.

15. A powder press with an assembly comprising an upper punch, a die, a lower punch fixedly clampable by means of a pallet in a lower punch chuck as well as a core rod fixedly clampable in a core rod chuck wherein said core rod is connected directly or indirectly to a first coupling element, whilst the lower punch is connected directly or indirectly to a second coupling element, this assembly comprising at least one magnetic coupling featuring at least one permanent magnet for coupling the two coupling elements.

* * * * *